United States Patent
Yokoi et al.

(10) Patent No.: US 7,573,042 B2
(45) Date of Patent: Aug. 11, 2009

(54) SEMICONDUCTOR DETECTION MODULE AND RADIATION DETECTION APPARATUS AND RADIOLOGICAL IMAGING APPARATUS USING THE SEMICONDUCTOR DETECTION MODULE

(75) Inventors: Kazuma Yokoi, Hitachi (JP); Takafumi Ishitsu, Hitachi (JP); Kensuke Amemiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/191,776

(22) Filed: Aug. 14, 2008

(65) Prior Publication Data

US 2009/0072159 A1    Mar. 19, 2009

(30) Foreign Application Priority Data

Sep. 19, 2007  (JP) .............................. 2007-241710

(51) Int. Cl.
  *G01T 1/24*    (2006.01)
(52) U.S. Cl. ................................. 250/370.09
(58) Field of Classification Search ............. 250/370.09
  See application file for complete search history.

(56) References Cited

U.S. PATENT DOCUMENTS

| | | | | |
|---|---|---|---|---|
| 4,727,256 | A | * | 2/1988 | Kumazawa ............... 250/370.1 |
| 6,285,028 | B1 | | 9/2001 | Yamakawa |
| 7,372,035 | B2 | * | 5/2008 | Yokoi et al. ............ 250/370.08 |
| 2005/0067574 | A1 | * | 3/2005 | Yokoi et al. ............ 250/370.01 |

FOREIGN PATENT DOCUMENTS

JP    2000-56021    2/2000

* cited by examiner

*Primary Examiner*—David P Porta
*Assistant Examiner*—Djura Malevic
(74) *Attorney, Agent, or Firm*—Brundidge & Stanger, P.C.

(57) ABSTRACT

Semiconductor detection modules 10 according to the present invention each comprises: one or more semiconductor detection elements 14 that receive radiation to generate induced charges as signals; and a pair of electrodes 12, 13 that are disposed to sandwich the one or more semiconductor elements 14, and obtains a data signal that is generated by the entrance of radiation into the semiconductor elements 14. In each of the semiconductor detection modules 10, a partial insulator 19 having an area smaller than that of the pair of electrodes 12, 13 is provided on at least one of the pair of electrodes 12, 13 at a place between the one electrode 12 and adjacent another electrodes 12, and between the one electrode 13 and adjacent another electrodes 13.

6 Claims, 5 Drawing Sheets

DIAGRAM OF FIG.2A VIEWED FROM A DIRECTION INDICATED BY AN ARROW A

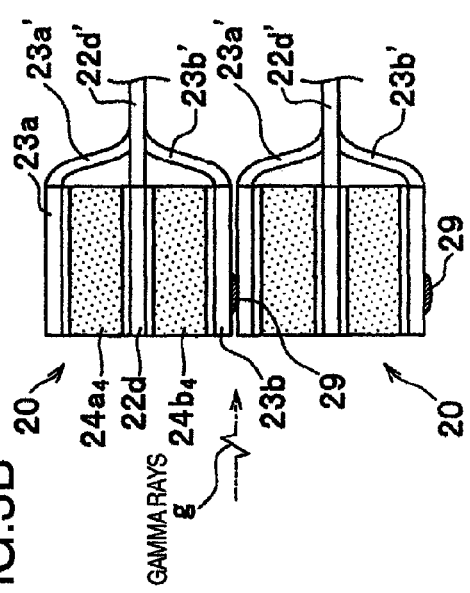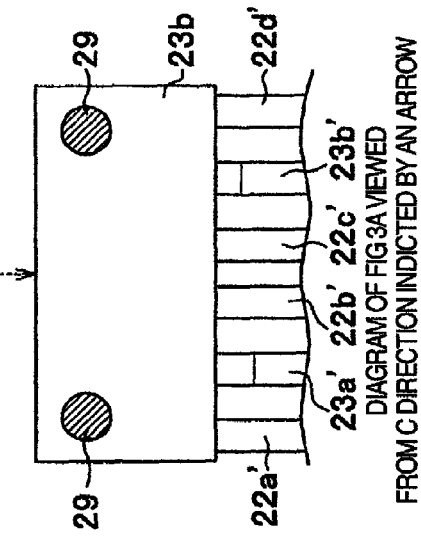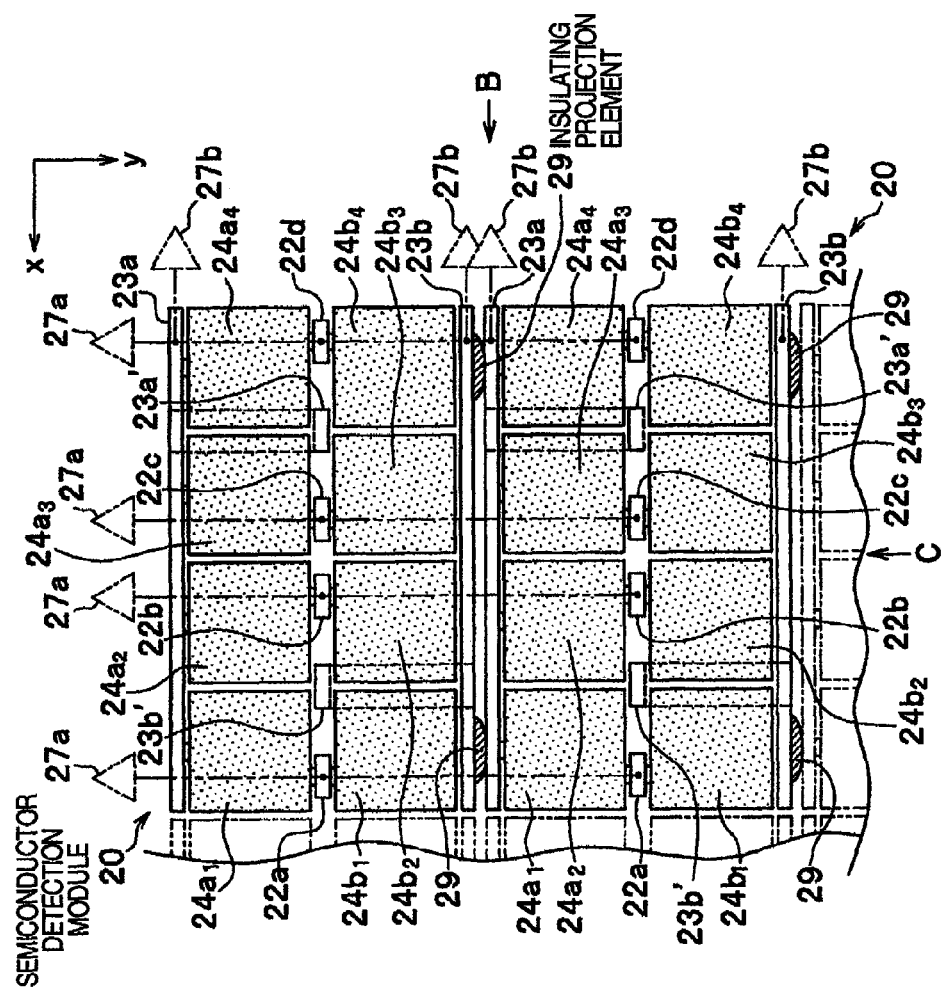

SEMICONDUCTOR DETECTION MODULE AND RADIATION DETECTION APPARATUS AND RADIOLOGICAL IMAGING APPARATUS USING THE SEMICONDUCTOR DETECTION MODULE

BACKGROUND OF THE INVENTION

The present invention relates to semiconductor detection modules in which semiconductor radiation detection elements can be replaced, and to a radiation detection apparatus or a radiological imaging apparatus or a nuclear medicine diagnostic apparatus, such as a single photon emission computer tomography apparatus (referred as a SPECT apparatus hereinafter) or a positron emission tomography apparatus (referred to as a PET apparatus hereinafter), using the semiconductor detection modules.

As a radiation detection apparatus for detecting radiation such as gamma rays, one using a NaI scintillator has conventionally been known.

FIG. 5 is a conceptual cross-sectional diagram showing an internal construction of a gamma camera 100 having a NaI scintillator 101.

As FIG. 5 shows, in the gamma camera 100 having the NaI scintillator 101, which is a kind of a nuclear medicine diagnostic apparatus, gamma rays 109 which are a form of radiation enter the NaI scintillator 101 with limited angles through though-holes 106s that are formed in a collimator 106. Then, the gamma rays interact with a NaI crystal of the NaI scintillator 101 to emit scintillation light. The light reaches a photomultiplier 103 via a light guide 102 to become an electric signal. The electrical signal is wave-shaped by a measurement circuit 104 that is attached to a measurement circuit fixing board 105, and is outputted from an output connector 107 to an external data collection system as shown by a white arrow.

These NaI scintillator 101, light guide 102, photomultiplier 103, measurement circuit 104, measurement circuit fixing board 105, and the like are all housed in a light blocking shield case 108. Electromagnetic waves other than outside radiation are blocked by the light blocking shield case 108.

Typically, the gamma camera using the scintillator has a structure in which the large photomultiplier 103, also referred to as a photomul, is disposed behind a crystal such as a sheet of large NaI, as shown in FIG. 5. Therefore, an intrinsic position resolution relative to a target object stays at approximately 4 mm.

In addition, the scintillator 101 performs detection after a process of multi-stage conversions; from radiation to visible light and from visible light to electrons. Therefore, the scintillator 101 has a problem that loss or the like arises during an intermediate stage and causes the scintillator 101 to have poor energy resolution. Therefore, it is impossible to separate scattered radiation that has mixed in during the intermediate stage, and the scattered radiation becomes noise. This deteriorates the SN ratio of a signal that represents information on a true position from which the gamma rays 109 are emitted, resulting in the deterioration of the image quality and an increase in the time required for picking up images.

Some PET apparatuses have a position resolution of 5 to 6 mm, while some high-end PET apparatuses have a position resolution of on the order of 4 mm. However, they also have a problem caused by the SN ratio.

Radiation detection apparatuses for detecting radiation based on a principle different from that of such a scintillator include a semiconductor detection apparatus 200 comprising semiconductor radiation detection elements 201, . . . that use a semiconductor material such as CdTe (cadmium telluride), TlBr (thallium bromide), and GaAs (gallium arsenide) (see FIG. 6). FIG. 6 is a diagram showing an example of an internal structure of a coupled part when a radiation detection apparatus is constructed by combining two semiconductor detection modules that are used for the nuclear medicine diagnostic apparatus or the like.

In the semiconductor detection apparatus 200, the semiconductor radiation detection elements 201, 202, 209, . . . directly convert an electric charge, which is generated by an interaction between the radiation and the semiconductor material of the semiconductor radiation detection elements 201, 202, 209, . . . into an electric signal. Thus, they perform conversion into an electric signal with efficiency higher than that of a scintillator, and have an excellent energy resolution. Therefore, the semiconductor detection apparatus 200 is now attracting attention. Here, having the excellent energy resolution means improvement of the SN ratio of the radiation detection signal indicating true position information, that is, improvement of detection accuracy. Moreover, various effects can be expected, such as improvement of contrast of an image and a reduction in the time required for picking up images. The two-dimensional disposition of the semiconductor radiation detection elements 201, 201, 209, . . . on a substrate allows detection of the position of a radiation emission source (see paragraphs 0120 and 0121, and FIG. 14 of JP-A-2000-56021).

SUMMARY OF THE INVENTION

The aforementioned semiconductor detection apparatus 200 has a problem that, when the semiconductor radiation detection elements 201, 202, 209, . . . are densely disposed, thermal noise caused by a large static capacitance between cathode electrode plates 205 and 206 adjacent to each other, in addition to a static capacitance of the semiconductor detection apparatus 200 itself, reduces energy resolution. This problem makes it impossible to simultaneously achieve both a high energy resolution and a high density detection apparatus (position resolution).

As FIG. 6 depicts, each of the detection modules 210 and 220 is structured such that a voltage application electrode 203 is sandwiched by the semiconductor cells 201 and 202 which are gamma ray detection elements, and the semiconductor cells 201 and 202 are sandwiched by the voltage application electrode 203 and by signal extraction electrodes 204 and 205. This structure is repeatedly formed. An insulator 207 constituted of resin or the like is provided throughout almost all parts of the electrodes 205 and 206. For example, as the insulator 207, an insulating film is adhered between the signal extraction electrodes 205 and 206.

However, the insulator 207, which is constituted of resin or the like and is provided throughout almost all parts of the electrodes 205 and 206, has high static capacitance, and is likely to reduce energy resolution. In addition, since the insulator 207 is provided throughout almost all parts of the electrodes 205 and 206, it has a large area when the semiconductor detection modules 210 and 220 are divided by a separation line indicated by a dashed-two dotted line C. Furthermore, when the semiconductor detection modules are inserted into a connector on a circuit substrate, or withdrawn from the connector on the circuit substrate for removal, an excessive friction force is likely to arise between the semiconductor detection modules 210 and 220. This deteriorates workability of replacing the semiconductor detection modules, thus causing an obstacle to an assembly activity and a maintenance activity.

The present invention has been made in view of the above circumstances. It is an object of the present invention to provide semiconductor detection modules each having a structure in which detection devices, which are densely provided and highly sensitive and have excellent energy resolution, are mounted in a manner that permits replacement. It is another object of the present invention to provide a radiation detection apparatus or a nuclear medicine diagnostic apparatus that employs such semiconductor detection modules.

The semiconductor detection modules according a first aspect of the present invention each comprises one or more semiconductor elements for receiving radiation to generate induced charges as signals, and a pair of electrodes which are disposed to sandwich the one or more semiconductor elements, and obtains a data signal generated by the entrance of radiation into the semiconductor elements. Moreover, in the semiconductor detection modules, a partial insulator is provided on one of the pair of electrodes between the one electrode and adjacent another electrode. The partial insulator has an area smaller than that of the pair of electrodes.

The radiation detection apparatus according to a second aspect of the present invention employs the semiconductor detection modules. The semiconductor detection modules each comprises semiconductor elements for receiving radiation to generate induced charges as signals, and a pair of electrodes that are disposed to sandwich the semiconductor elements, and obtains a data signal generated by the entrance of the radiation into the semiconductor elements, wherein partial insulators are disposed on one of the pair of electrodes between the one electrode and adjacent another electrode. The partial insulators have an area smaller than that of the pair of electrodes.

The nuclear medicine diagnostic apparatus according to a third aspect of the present invention employs the semiconductor detection modules. The semiconductor detection modules each comprises one or more semiconductor elements for receiving radiation to generate induced charges as signals, and a pair of electrodes that are disposed to sandwich the one or more semiconductor elements, and obtains a data signal generated by the entrance of radiation into the semiconductor elements, wherein a partial insulator is provided on one of the pair of electrodes between the one electrode and adjacent another electrode. The partial insulator has an area smaller than that of the pair of electrodes.

The present invention is capable of achieving semiconductor detection modules each having a structure in which detection devices, which are densely disposed, are highly sensitive, and have excellent energy resolution, can be mounted in a manner that permits replacement. Furthermore, the present invention is capable of achieving a radiation detection apparatus or a nuclear medicine diagnostic apparatus that employs such semiconductor detection modules.

Other objects, features and advantages of the invention will become apparent from the following description of the embodiments of the invention taken in conjunction with the accompanying drawings.

BRIEF DESCRIPTION OF THE DRAWINGS

FIG. 3A is a top view of semiconductor detection modules viewed from a direction in which gamma rays enter the matrix read-type semiconductor detection elements according to a second embodiment;

FIG. 3B is a diagram of the semiconductor detection modules of FIG. 3A viewed from a direction indicated by an arrow B;

FIG. 3C is a diagram of the semiconductor detection modules of FIG. 3A viewed from a direction indicated by an arrow C;

DESCRIPTION OF THE EMBODIMENTS

Embodiments of the present invention will be described below with reference to the accompanying drawings.

Figure 1:
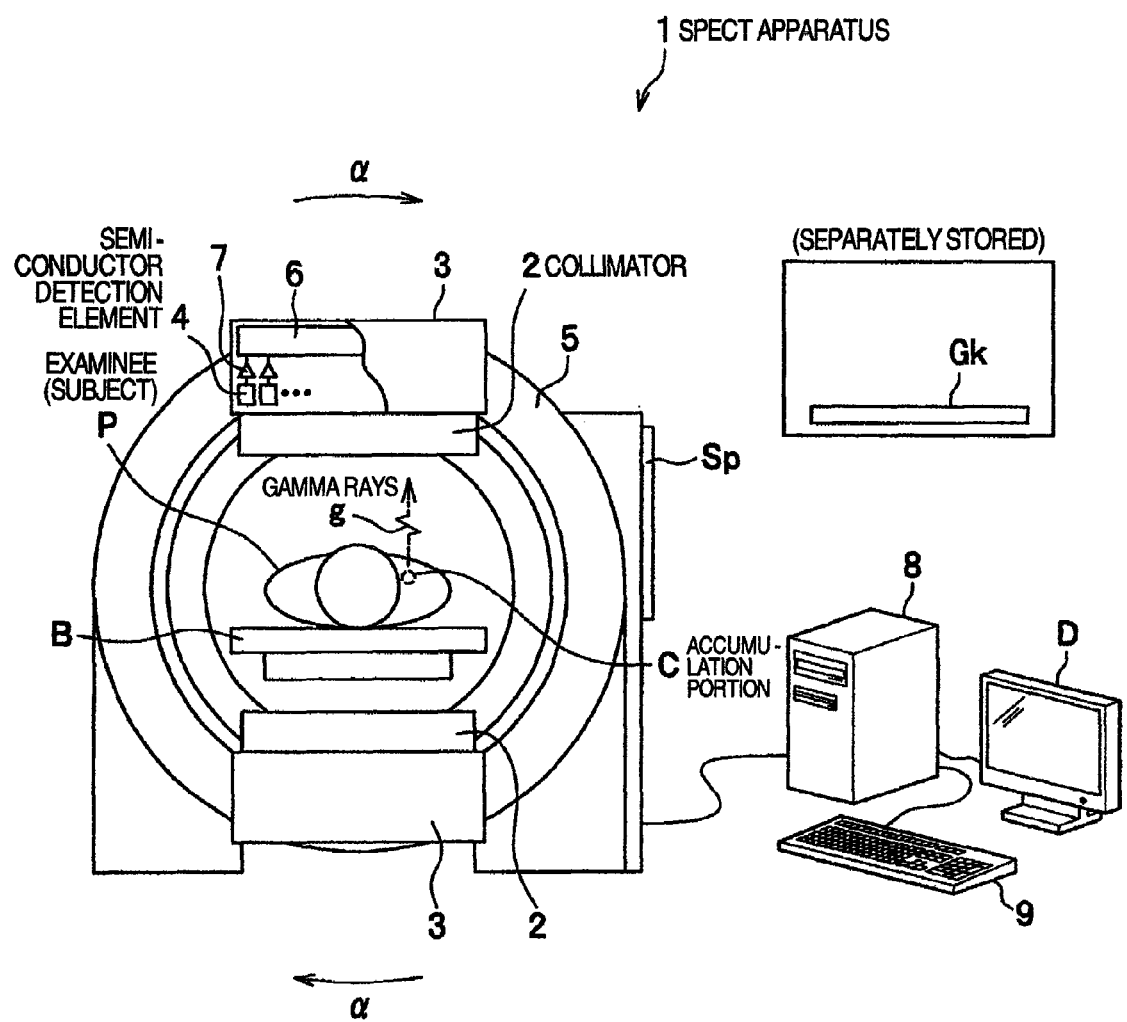
FIG. 1 is a conceptual diagram showing the general configuration of a SPECT apparatus, which is a nuclear medicine diagnostic apparatus, according to the embodiments of the present invention.

FIG. 1 is a conceptual diagram showing the general configuration of a SPECT apparatus, which is a nuclear medicine diagnostic apparatus, according to an embodiment of the present invention.

(Configuration of Nuclear Medicine Diagnostic Apparatus)

The SPECT apparatus 1 comprises: a bed B on which a subject P lies; collimators 2 for causing gamma rays that travel in a predetermined direction, of the gamma rays g that are emitted associated with the disintegration of a radioactive medicine that is administered to the subject P lying on the bed B, to pass through collimator holes; a plurality of semiconductor detection units 3 for generating a signal based on the gamma rays g that passed through the collimators 2 and for performing signal processing to the signal; a rotation support stand 5 for supporting the semiconductor detection units 3 and for rotating the outer circumference of the subject P in a direction indicated by an arrow α; a data collection and analysis device 8 for collecting and analyzing data based on the data that is obtained and processed by the semiconductor detection units 3; a display device D as an output device for displaying the result of the data analysis; and an input operating device 9, such as a keyboard, which is used by an operator to perform input operations while viewing the display device D.

The semiconductor detection units 3, 3 which are disposed on the rotation support stand 5 independently rotate in accordance with the rotational operation of the rotation support stand 5 in the direction of the arrow α. The two units may be disposed side by side so as to increase an image-pickup area, or they may be used as a gamma camera for performing planar imaging. The semiconductor detection units 3 each comprises a plurality of semiconductor detection elements 4, and a plurality of signal amplifiers 7, which are connected to a data processing circuit 6 having a number of integrated circuits.

Between the semiconductor detection unit 3 and subject P, the collimator 2 is provided. The collimator 2 is formed with a radiation shielding material (e.g., lead, tungsten, or the like) and has a number of collimator holes. This restricts the angle at which the semiconductor detection unit 3 views the gamma rays g that are emitted associated with the disintegration of the radioactive medicine in the subject P.

In other words, the interposition of the collimator 2 allows the semiconductor detection unit 3 to receive gamma rays g traveling in a given direction, of the gamma rays g in a accumulation portion C where the radioactive medicine within the subject P is accumulated, to thereby obtain data in the radioactive medicine accumulation portion C, or inspection data on the subject P, such as the position of a diseased part and progression of disease.

Semiconductor detection elements 4 in the semiconductor detection unit 3 are applied with voltage of about 500V. When the gamma rays g enter the semiconductor detection elements 4, the semiconductor detection elements 4 generate induced charges as signals and obtain original data based on which inspection data for the subject P is created. For this reason, the semiconductor detection unit 3 has a light/electromagnetic shield made of aluminum or the like as a base material. The light/electromagnetic shield blocks the effects of electromagnetic waves other than the gamma rays g emitted from the subject P.

The rotation control of the rotation support stand 5, control of the distance between the semiconductor detection unit 3 and the subject P, and position control of the subject P by the bed B can be performed by an operation panel Sp in the vicinity of the SPECT apparatus, and also can be performed by the control of the data collection and analysis device 8 from a long distance. In addition, a radiation source Gk for external calibration is separately stored.

(Outline of Inspection by the Nuclear Medicine Diagnostic Apparatus)

In the next place, the outline of the inspection of the subject P by the SPECT apparatus 1 will be described.

First, the bed B is moved outwardly of the rotation support stand 5 by a movement mechanism thereof.

When the subject P, who is administered with the radioactive medicine, gets on and lies on the bed that is moved outwardly of the rotation support stand 5, the bed B carrying the subject P thereon is moved between the semiconductor detection units 3, 3 within the rotation support stand 5 by the movement mechanism, as is shown in FIG. 1.

From the body of the subject P lying on the bed B, gamma rays g or annihilation gamma-rays g are emitted associated with the disintegration of the radioactive medicine.

Of the gamma rays emitted, in association with the disintegration of the radioactive medicine, from the accumulation portion C where the radioactive medicine within the body of the subject is accumulated, gamma rays g traveling in a given direction pass through collimator holes (not shown) formed in the collimator 2, and enter each of the semiconductor detection elements 4 in the semiconductor detection unit 3.

The induced charges as signals, which are outputted from the semiconductor detection elements 4 in association of the entrance of the gamma rays g, is subjected to wave shaping and amplification by the signal amplifier 7 in the semiconductor detection unit 3. Thereafter, the induced charges as signals are subjected to signal processing of a subsequent-stage in a data processing circuit 6 in the semiconductor detection unit 3, such as analog-to-digital conversion of obtained voltage signal wave height (equivalent to energy), conversion of an amplifier address to a detector XY address, obtaining of data time information, and real time wave height calibration for correcting characteristics such as the thickness of individual semiconductor detection elements 4.

Then, the data signal that is processed in the data processing circuit 6 is inputted into the data collection and analysis device 8, where the data signal is stored, and is subjected to energy spectrum analysis and image processing. Thereafter, visual information for user is outputted to the display device D or the like by an input operation by the user.

First Embodiment

Figure 2A:
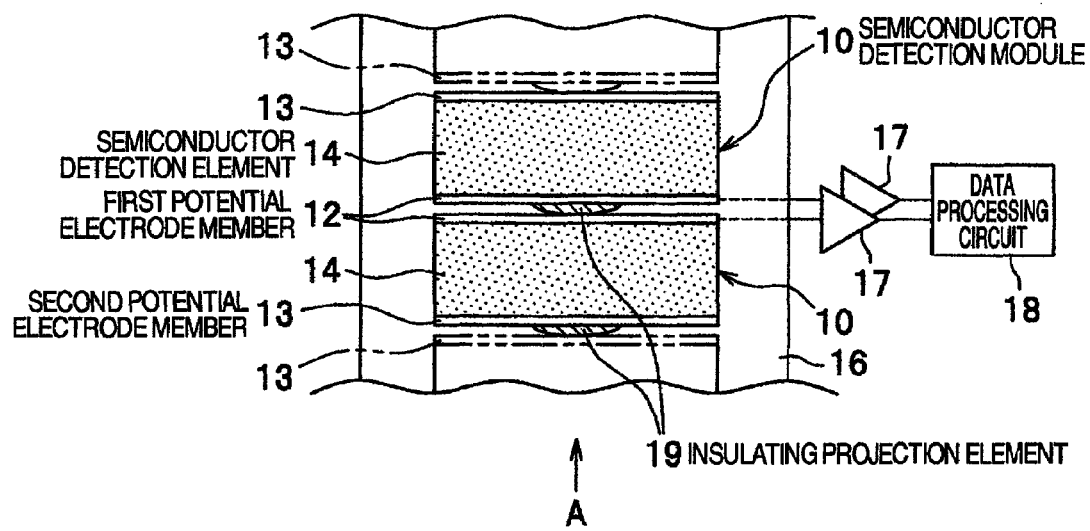
FIG. 2A is a top view of semiconductor detection modules viewed from a direction in which gamma rays enter semiconductor detection elements of the semiconductor detection modules according to a first embodiment of the present invention.
Figure 2B:
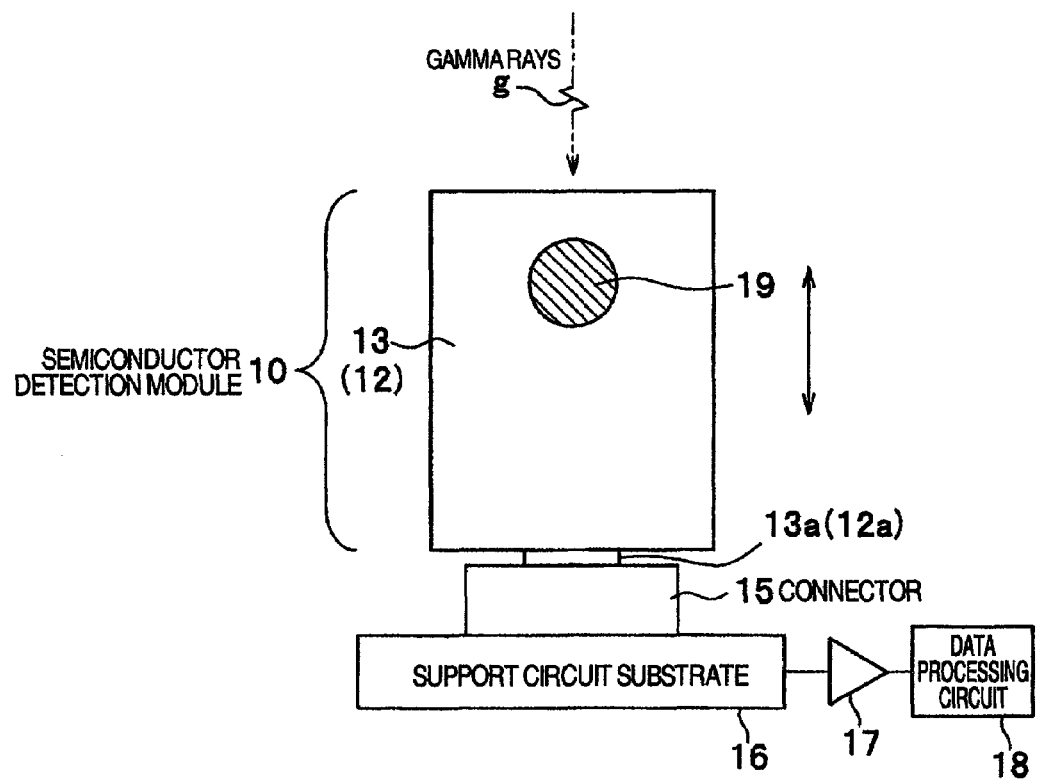
FIG. 2B is a diagram of the semiconductor detection modules of the first embodiment of the present invention viewed from a direction indicated by an arrow A.

FIGS. 2A and 2B show single pixel-type semiconductor detection modules 10 according to a first embodiment. FIG. 2A is a top view of the semiconductor detection modules 10 viewed from a direction in which the gamma rays g shown in FIG. 1 enter the semiconductor detection elements 14 of the semiconductor detection modules 10. FIG. 2B is a diagram of the semiconductor modules 10 of FIG. 2A viewed from a direction indicated by an arrow A.

Each of the semiconductor detection modules 10 shown in FIGS. 2A and 2B has one or more semiconductor detection elements 14. Each of the semiconductor detection elements 14, as one pixel, reads a signal generated by the entrance of the gamma rays g. In addition, each of the semiconductor detection elements 14 is provided with a first potential electrode member 12 and a second potential electrode member 13 on both ends thereof. An insulating projection element 19 comprised of an insulator, which will be described later, is disposed between the first potential electrode members 12, 12 and between the second potential electrode members 13, 13 of adjacent semiconductor detection elements 14, 14.

Here, discussion will be made on the dense disposition of the semiconductor detection elements 14. If electrodes of different potential are brought close together, then a problem arises, such as an electric discharge. Therefore, electrodes of the same potential, or the first potential electrode members 12, 12, and second potential electrode members 13, 13 are disposed to the adjacent semiconductor detection elements 14, 14 to face each other. However, even if electrodes of the same potential are disposed, insulation is required in order to avoid mixing of signals into adjacent pixels. Generally, large direct current resistance can easily be obtained by inserting a full-surface sheet-like insulator between the first potential electrode members 12, 12 and between the second potential electrode members 13, 13 of the adjacent semiconductor detection elements 14, 14. However, since insulators such as resins usually have relative permittivity of 3 to 4, they tend to have large static capacitance when they are densely disposed in a narrow gap of 10 to 100 μm.

For example, in an ideal mounting in which there are no dimensional error and disposition error, insulators are not required. However, when trying to increase density, dimensional errors, disposition errors, and the like must actually be considered in manufacturing. Therefore, the insulators are essentially required. The reason is that crosstalk increases between the adjacent electrode members, and thermal noise increases in the semiconductor detection elements 14 themselves due to an increase in static capacitance, and, as a result, energy resolution is reduced.

Therefore, the insulating projection element 19 is provided that is comprised of an insulator having an area sufficiently smaller than that of the electrode members 12, 13 (e.g., one-hundredth). This can bring the static capacitance between electrodes, or the static capacitance between the first potential electrode members 12, 12 and between the second potential electrode members 13, 13 of adjacent semiconductor detection elements 14, 14 close to that of air that has the lowest relative permittivity. Here, air has a relative permittivity of about 1 close to that of a vacuum having a relative permittivity of 1.

It should be noted that the greatest improvement is achieved in the positional accuracy of the semiconductor detection elements 14, when the insulating projection element 19 is disposed at an end side far from a fixed end 15, for example a connector 15 (fixed means), as shown in FIG. 2B. This prevents the adjacent semiconductor detection elements 14 from getting excessively close to each other, and allows an adequate space to be secured therebetween.

In addition, as FIG. 2A shows, the insulating projection element 19 provided on the first potential electrode member 12, and the insulating projection element 19 provided on the second potential electrode member 13 contact adjacent another first potential electrode member 12, and adjacent another second potential electrode member 13, respectively, via bent surfaces thereof each having a curvature. Therefore, the contact area is small, and thereby sliding friction is small, thus allowing easy sliding and smooth replacement of the semiconductor detection modules 10.

Furthermore, if the total area of the insulating projection elements 19 is kept sufficiently smaller than that of electrode members 12, 13, a plurality of insulating projection elements 19 may be provided between the first potential electrode members 12, 12 or between the second potential electrode members 13, 13.

Lower part of the first potential electrode member 12 and the second potential electrode member 13 that sandwich the semiconductor detection element 14 is connected to an insertion terminal 12a or 13a, as shown in FIG. 2B. When the insertion terminals 12a, 13a are inserted into a connector 15 on the support circuit substrate 16 mounted on the semiconductor detection unit 3, the semiconductor detection module 10 is fixed to a predetermined place of the semiconductor detection unit 3 by the support circuit substrate 16 and are electrically connected to various electric circuits in the semiconductor detection unit 3.

As described above, the semiconductor detection module 10 is configured to comprise: one or more semiconductor detection elements 14; a first potential electrode member 12; a second potential electrode member 13; an insulating projection element 19; and an insertion terminal 12a and 13a. Additionally, the semiconductor detection module 10 is configured to be attachable/detachable to and from the connector 15 on the support circuit substrate 16 in a direction indicated by an arrow shown in FIG. 2B.

Here, when the semiconductor detection module 10 is attached or detached to or from the connector 15, the semiconductor detection module 10 slides along adjacent another semiconductor detection module 10 via the insulating projection member 19. At this time, since the contact area of the insulating projection element 19 is smaller than that of the electrode members 12 and 13 of the semiconductor detection module 10, frictional force is small, thereby allowing smooth attachment/detachment of the semiconductor detection module 10.

Next, functions of the semiconductor detection unit 3 having the semiconductor detection modules 10 will be described.

Predetermined potentials are applied, via the connector 15, to the first potential electrode members 12, 13 that sandwich the semiconductor detection element 14 in the semiconductor detection module 10.

When the gamma rays g from the accumulation portion C where radioactive medicine of the subject P is accumulated enter the semiconductor detection elements 14 of the semiconductor detection module 10 as shown in FIG. 1, pairs of electron and hole are generated in the semiconductor detection elements 14 due to ionization effect of the gamma rays g in the semiconductor detection elements 14. Then, when different potentials are applied to the first potential electrode member 12 and second potential electrode member 13, electrons are collected to an electrode having a relatively high potential, and holes are collected to an electrode having a low potential.

Along with the collection of the charge of the electron-hole pairs in the semiconductor detection module 10, as shown in FIGS. 2A and 2B, an induced charge signal generated in the first potential electrode members 12 is sent to a data processing circuit 18 via the insertion terminals 12a, 13a, connector 15, support circuit substrate 16, and signal amplifier 17, and thereby energy information, position information, timing information and the like of the accumulation portion C are obtained.

The semiconductor detection module 10 according to the first embodiment of the present invention employs the insulating projection element 19. This reduces a contact area between one semiconductor detection module 10 and adjacent another semiconductor detection module 10, and thereby reduces friction force. As a result, this allows efficient attachment and detachment of the semiconductor detection module 10, for replacement or other purposes, to or from the connector 15 of the semiconductor detection unit 3 when the semiconductor detection modules are densely mounted.

In addition, by providing the insulating projection element 19 having a smaller area than that of the electrode members between the electrode members, large air spaces can be secured between the electrode members 12, 12. As a result, static capacitance between the electrode members can be reduced, thus making it possible to improve the SN ratio of information signals to be obtained.

It should be noted that the number of the semiconductor detection elements 14 in the semiconductor detection module 10 can be selected as appropriate.

Second Embodiment

FIGS. 3A to 3C show matrix reading type semiconductor detection modules 20 according to a second embodiment of the present invention.

Figure 4:
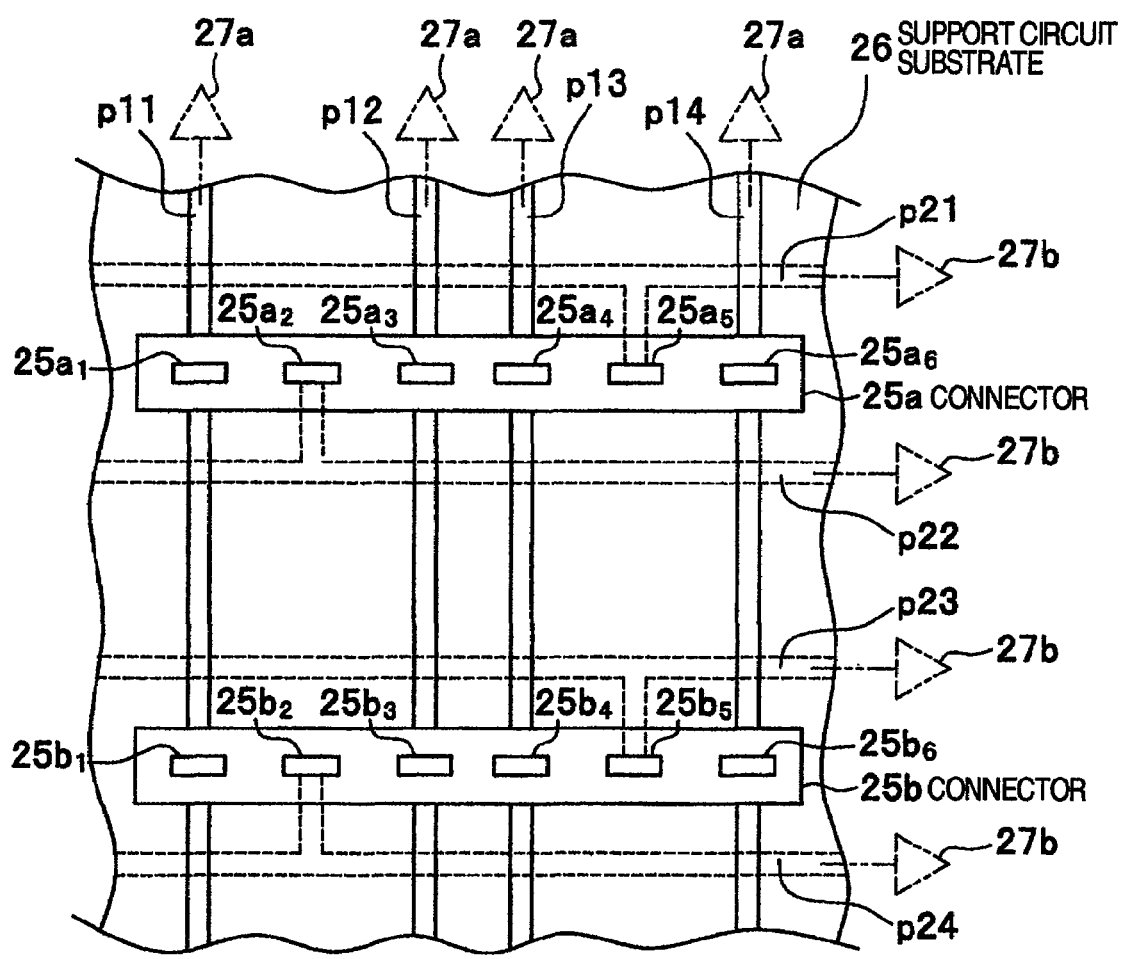
FIG. 4 is a top view of a support circuit substrate in which connectors for mounting thereon the semiconductor detection modules shown in FIGS. 3A to 3C are standingly provided.
Figure 5:
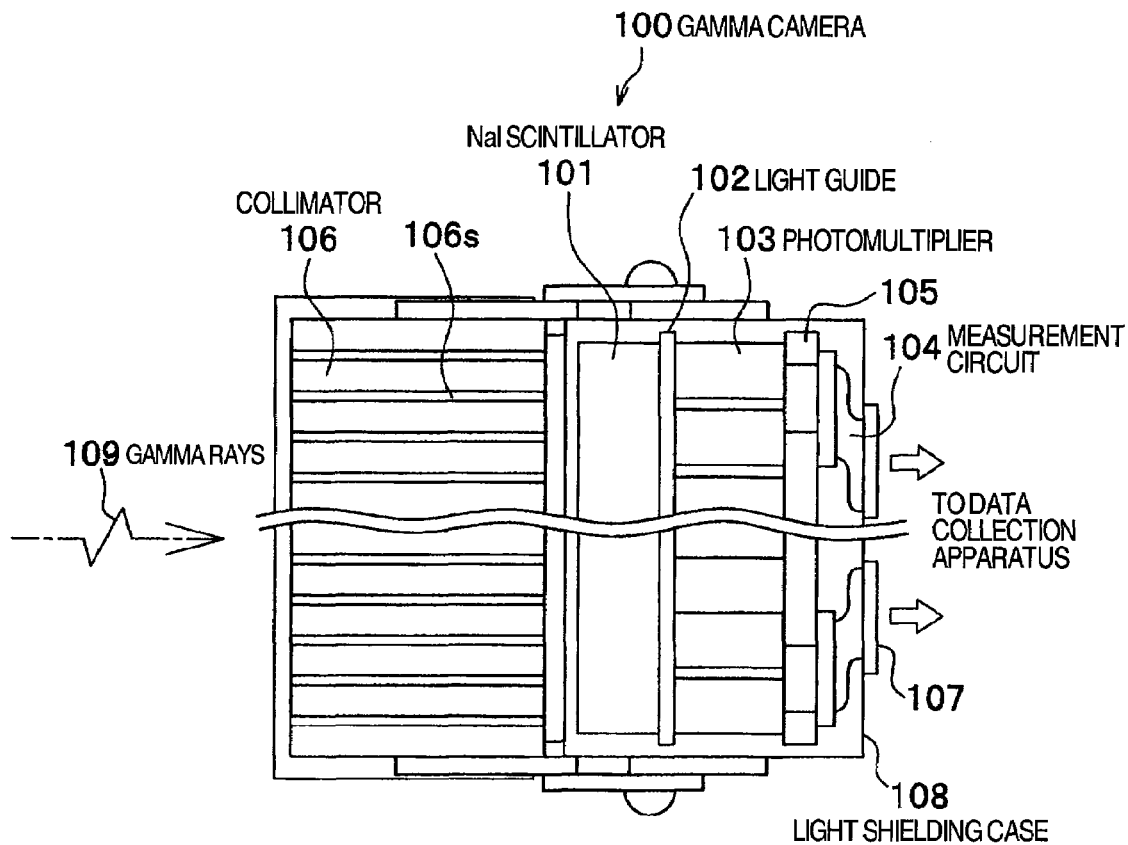
FIG. 5 is a conceptional cross-sectional diagram showing an internal configuration of an gamma camera having a conventional NaI scintillator.
Figure 6:
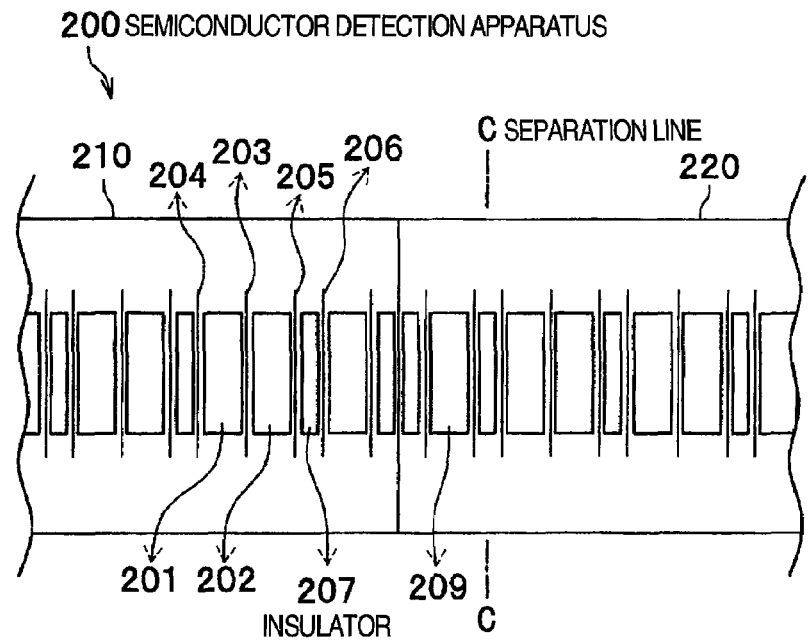
FIG. 6 is a diagram showing an example of an internal structure of a connection part of a radiation detection apparatus which is constructed by combining two semiconductor detection modules that are used for a conventional nuclear medicine diagnostic apparatus.

FIG. 3A is a top view of the semiconductor detection modules 20 viewed from the direction in which the gamma rays g shown in FIG. 1 enter semiconductor detection elements 24 of the semiconductor detection modules 20. FIG. 3B is a diagram of the semiconductor detection modules 20 viewed from an direction indicated by an arrow B. FIG. 3C is a diagram of the semiconductor detection modules 20 viewed from an direction indicated by an arrow C. FIG. 4 is a top view of a support circuit substrate 26 in which connectors (fixation means) 25a, 25b for installing the semiconductor detection modules 20 shown in FIGS. 3A to 3C are standingly provided.

FIG. 3A shows the disposed matrix read-type semiconductor detection modules 20 by two solid lines.

As FIG. 3A shows, the matrix read-type semiconductor detection modules 20 each comprises: a plurality of semiconductor detection elements 24 (24a1, 24a2, 24a3, 24a4, 24b1, 24b2, 24b3, and 24b4); split first potential electrode members 22 (22a, 22b, 22c, and 22d) which are electrodes of the semiconductor detection elements 24; second potential electrode members 23 (23a, 22b); and insulating projection elements 29 which are comprised of an insulator or the like and, are formed on the second potential electrode members 23*b* (see FIGS. 3B and 3C). Here, the plurality of semiconductor detection elements 24*a*1, 24*a*2, 24*a*3, and 24*a*4 may be formed of, for example, one semiconductor parent material, with only the first electrode members 22 of a plurality of electrode films being split.

The semiconductor detection elements 24*a*1, 24*b*1 are connected to the split first potential electrode member 22*a* on one side thereof. In the same way, the semiconductor detection elements 24*a*2, 24*b*2 are connected to the split first potential electrode member 22*b* on one side thereof. The semiconductor detection elements 24*a*3, 24*b*3 are connected to the split first potential electrode member 22*c* on one side thereof. The semiconductor detection elements 24*a*4, 24*b*4 are connected to the split first potential electrode member 22*d* on one side thereof.

In addition, the other side of the semiconductor detection elements 24*a*1, 24*a*2, 24*a*3, and 24*a*4 is connected to the second potential electrode member 23*a*. In the same way, the other side of the semiconductor detection elements 24*b*1, 24*b*2, 24*b*3, and 24*b*4 is connected to the second potential electrode member 23*b*. The semiconductor detection elements 24 and electrode members 22, 23 are electrically and mechanically connected by a conductive adhesive or the like.

As FIGS. 3B and 3C show, the split first potential electrode members 22*a*, 22*b*, 22*c*, and 22*d* are formed with insertion terminals 22*a*', 22*b*', 22*c*' and 22*d*', respectively, that extend linearly downwardly (to the back side of the paper of FIG. 3A perpendicularly). Insertion terminals 23' (23*a*', 23*b*') that are formed under the second potential electrode members 23*a*, 23*b* (towards the back side of the paper of FIG. 3A perpendicularly) are bent to a position where they form a straight line with the split first potential electrode members 22*a*, 22*b*, 22*c*, and 22*d*, as shown in FIG. 3A. Additionally, they are bent downward at this position (towards the back side of the paper of FIG. 3A perpendicularly), as shown in FIGS. 3B and 3C (see FIG. 3B).

As noted above, insertion terminals 22*a*', 22*b*', 22*c*', and 22*d*' of the split first potential electrode members 22*a*, 22*b*, 22*c*, and 22*d* as well as insertion terminals 23*a*' and 23*b*' of the second potential electrode members 23*a* and 23*b* are formed under the semiconductor detection module 20 to extend downward to thereby form straight lines when viewed from top, as shown FIG. 3A.

As FIG. 4 shows, on the top end of a connector 25*a* which is standingly provided on the support circuit substrate 26, insertion terminals 25 (25*a*1, 25*a*2, 25*a*3, 25*a*4, 25*a*5, and 25*a*6) corresponding to insertion terminals 22*a*', 23*b*', 22*b*', 22*c*', 23*a*' and 22*d*' of the semiconductor detection module 20 open upward in a linear fashion. In a similar way, on the top end of a connector 25*b* which is standingly provided on the support circuit substrate 26, insertion terminals 25*b*1, 25*b*2, 25*b*3, 25*b*4, 25*b*5, and 25*b*6 corresponding to insertion terminals 22*a*', 23*b*', 22*b*', 22*c*', 23*a*' and 22*d*' of the semiconductor detection module 20 open upward in a linear fashion.

The above configuration allows the one semiconductor detection module 20 shown in FIG. 3A, to be mechanically supported by and electrically connected to the connector 25*a* on the support circuit substrate 26 by inserting the insertion terminals 22*a*', 23*b*', 22*b*', 22*c*' 23*a*', and 22*d*', shown in FIGS. 3A to 3C, into the corresponding insertion slots 25*a*1, 25*a*2, 25*a*3, 25*a*4, 25*a*5, and 25*a*6 of the connector 25*a* shown in FIG. 4 (see FIG. 2B).

In the same token, the other semiconductor detection module 20 shown in FIG. 3A, is mechanically supported by and electrically connected to the connector 25*b* on the support circuit substrate 26 by inserting the insertion terminals 22*a*', 23*b*', 22*b*', 22*c*' 23*a*', and 22*d*', shown in FIGS. 3A to 3C, into the corresponding insertion slots 25*b*1, 25*b*2, 25*b*3, 25*b*4, 25*b*5, and 25*b*6 of the connector 25*b* shown in FIG. 4 (see FIG. 2B).

By bending the insertion terminal 23' of a second potential electrode member 23 in a way described above, the semiconductor detection module 20, as one module, can be connected to one connector 25 (25*a*, 25*b*) (see FIG. 4) having linear shaped insertion slots on the top end thereof without the connector being divided into a plurality of connectors.

Furthermore, as FIG. 4 shows, on the support circuit substrate 26, a wiring pattern p11 is formed that is electrically continuous with the insertion slots 25*a*1 and 25*b*1 of the connector 25*a* and 25*b*. In addition, a wiring pattern p12 is formed that is electrically continuous with the insertion slots 25*a*3 and 25*b*3. A wiring pattern p13 is formed that is electrically continuous with the insertion slots 25*a*4 and 25*b*4. A wiring pattern p14 is formed that is electrically continuous with the insertion slots 25*a*6 and 25*b*6.

Moreover, on the support circuit substrate 26, a wiring pattern p21 (shown by broken lines in FIG. 4) is formed that is insulated from the wiring patterns p11, p12, p13, and p14, and is electrically continuous with the insertion slots 25*a*5 of the connector 25*a*. Moreover, a wiring pattern p22 (shown by broken lines in FIG. 4) is formed that is electrically continuous with the insertion slot 25*a*2 of the connector 25*a*. In the same token, a wiring pattern p23 (shown by broken lines in FIG. 4) is formed that is insulated from above wiring patterns p11, p12, p13, and p14 and is electrically continuous with the insertion slot 25*b*5 of the connector 25*b*, and a wiring pattern p24 (shown by broken lines in FIG. 4) is formed that is electrically continuous with the insertion slot 25*b*2 of the connector 25*b*.

The wiring patterns p11, p12, p13, and p14 on the support circuit substrate 26 are each connected to a signal amplifier 27*a* for obtaining X-position information shown in FIG. 3A, with the signal amplifier 27*a* being connected to subsequent stage circuits.

Moreover, the wiring patterns p21, p22, p23, and p24 on the support circuit substrate 26 are each connected to a signal amplifier 27*b* for obtaining Y-position information shown in FIG. 3A, with the signal amplifier 27*b* being connected to subsequent stage circuits.

As noted above, by mounting the one semiconductor detection module 20 on the connector 25*a* shown in FIG. 3A, the first potential electrode member 22*a* of the one semiconductor detection module 20 is electrically connected to the wiring pattern p11 of the support circuit substrate 26, and the split first potential electrode member 22*b* is electrically connected to the wiring pattern p12 of the support circuit substrate 26. The split first potential electrode member 22*c* is electrically connected to the wiring pattern p13 of the support circuit substrate 26. The split first potential electrode member 22*d* is electrically connected to the wiring pattern p14 of the support circuit substrate 26. Moreover, the second potential electrode member 23*a* of the one semiconductor detection module 20 is electrically connected to the wiring pattern p21 of the support circuit substrate 26. The second potential electrode member 23*b* is connected to the wiring pattern p22 of the support circuit substrate 26.

By mounting the other semiconductor detection module 20 shown in FIG. 3A on the connector 25*b*, the split first potential electrode member 22*a* of the other semiconductor detection module 20 is electrically connected to the wiring pattern p11 of the support circuit substrate 26, and the split first potential electrode member 22*b* is electrically connected to the wiring pattern p12 of the support circuit substrate 26. The split first potential electrode member 22c is electrically connected to the wiring pattern p13 of the support circuit substrate 26, and the split first potential electrode member 22d is electrically connected to the wiring pattern p14 of the support circuit substrate 26. The second potential electrode member 23a of the other semiconductor detection module 20 is electrically connected to the wiring pattern p23 of the support circuit substrate 26, and the second potential electrode member 23b is electrically connected to the wiring pattern p24 of the support circuit substrate 26.

In this manner, the induced charge signal of the semiconductor detection elements 24 of the semiconductor detection modules 20, 20 can be obtained by the wiring patterns p of the support circuit substrate 26 via the split first potential electrode members 22 and the second potential electrode members 23. The X-position information can be obtained by a set of signal amplifiers 27a via the split first potential electrode members 22 and wiring patterns p11, p12, p13, and p14. The Y-position information can also be obtained by a set of signal amplifiers 27b via the second potential electrode members 23 and wiring patterns p21, p22, p23, and p24.

In other words, it is possible to obtain information on two-dimensional positions that are substantially perpendicular to each other, and to collect information on the accumulation portion C of the subject P, by instantaneously determining signals that are obtained from the split first potential electrode members 22 and second potential electrode members 23 based on common matrix reading.

In addition, as shown in FIGS. 3A to 3C, the semiconductor detection module 20 has two insulating projection elements 29 comprised of an insulator that are formed on the outer surface of the second potential electrode member 23b and in the vicinity of corner portions when seen in the top view. The insulating projection elements 29 are capable of dealing with a twist-induced error in the dimension of the semiconductor detection module 20, of maintaining reliable insulation from the adjacent semiconductor detection module 20, and of improving positional accuracy.

If the area of the insulating projection elements 29 is kept sufficiently smaller than that of the electrode members 23b and 23a (e.g., to one hundredth), then the insulating projection elements 29 can reduce the static capacitance between the second potential electrode members 23b and 23a of the semiconductor detection elements 24b, 24a adjacent to each other to a level near to air having the lowest relative permittivity. Here, as noted earlier, air has a relative permittivity of approximately 1 near to 1 that is relative permittivity of a vacuum.

It should be noted that the insulating projection elements 29 are most effective in improving positional accuracy of the semiconductor detection elements 24a (24a1, 24a2, 24a3, and 24a4) and 24b (24b1, 24b2, 24b3, and 24b4) when the insulating projection elements 29 are disposed at a fixed end, for example at an end side farthest from the connector 26, as shown in FIG. 3C. Any number of the insulating projection elements 29 may be provided if a total area of the insulating projection elements 29 can be kept sufficiently smaller than that of the second potential electrode members 23b and 23a.

Moreover, any number of semiconductor detection modules 20 may be disposed on the support circuit substrates 26 as depicted by dashed-two dotted lines in FIG. 3A, by disposing subsequent stage circuits, such as signal amplifiers connected to the wiring patterns p of the support circuit substrate 26.

According to the second embodiment, since the static capacitance is proportional to the area of the electrode members 23b and 23a, the structure having small insulating projection elements 29 between the electrode members is highly effective when the electrodes has large areas, so that the static capacitance can be reduced. As a result, it is possible to improve the SN ratio of information signals to be obtained.

The structure according to the second embodiments is also very effective in reducing friction force to thereby exhibit excellent sliding properties. Since the electrodes have particularly large areas, the semiconductor detection modules 20 for reading in matrix are highly effective.

While the SPECT inspection apparatus has been described in the present embodiment, it can also be achieved as a PET apparatus by disposing a group of detection devices such that they face a target at an angle of 180 degrees, and by adding a circuit of time detection system in addition to a wave height read system. Moreover, the SPECT inspection apparatus is widely applicable as a nuclear medicine diagnostic apparatus such as a gamma camera. It is also applicable to a radiation detection apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. Semiconductor detection modules, each comprising:
   one or more semiconductor elements for receiving radiation to generate induced charges as signals; and
   a pair of electrodes disposed to sandwich said one or more semiconductor elements, wherein:
   one or more partial insulators having an area smaller than that of said pair of electrodes are provided to at least one of said pair of electrodes between said one electrode and adjacent another electrode.

2. The semiconductor detection modules according to claim 1, wherein:
   the positioning relative to the adjacent semiconductor elements is performed through the use of said one or more partial insulators.

3. The semiconductor detection modules according to claim 1, wherein:
   said one or more partial insulators contact said adjacent another electrode through a curved surface thereof having a curvature.

4. The semiconductor detection modules according to claim 1, wherein:
   said one or more partial insulators are disposed in a half region of said electrode on the side farther spaced from a fixing means to which said electrode is fixed.

5. A radiation detection apparatus that employs said semiconductor detection modules according to claim 1.

6. A nuclear medicine diagnostic apparatus that employs said semiconductor detection modules according to claim 1.

* * * * *